US010575369B2

United States Patent
Price et al.

(10) Patent No.: US 10,575,369 B2
(45) Date of Patent: Feb. 25, 2020

(54) VOICE CONTROLLED INFORMATION DELIVERY IN PAIRED DEVICES

(71) Applicant: GOOGLE LLC, Mountain View, CA (US)

(72) Inventors: Thomas Price, San Francisco, CA (US); Anurag Agrawal, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 8 days.

(21) Appl. No.: 15/659,885

(22) Filed: Jul. 26, 2017

(65) Prior Publication Data

US 2019/0037642 A1   Jan. 31, 2019

(51) Int. Cl.
| | |
|---|---|
| *H04W 92/18* | (2009.01) |
| *G10L 13/033* | (2013.01) |
| *H04M 3/533* | (2006.01) |
| *H04N 21/258* | (2011.01) |
| *H04N 21/4227* | (2011.01) |

(52) U.S. Cl.
CPC .......... *H04W 92/18* (2013.01); *G10L 13/033* (2013.01); *H04M 3/53333* (2013.01); *H04N 21/25866* (2013.01); *H04N 21/4227* (2013.01); *H04M 2203/4509* (2013.01)

(58) Field of Classification Search
CPC .................................................... H04W 92/18
USPC ........................................................ 704/246
See application file for complete search history.

(56) References Cited

U.S. PATENT DOCUMENTS

| | | | |
|---|---|---|---|
| 8,315,875 B2 | 11/2012 | Burns et al. | |
| 8,498,572 B1 | 7/2013 | Schooley et al. | |
| 8,806,209 B2* | 8/2014 | Hemphill | H04L 9/0819 |
| | | | 713/171 |
| 9,148,431 B2* | 9/2015 | Chmaytelli | H04L 63/101 |
| 9,197,313 B2 | 11/2015 | Delpuch | |
| 9,524,631 B1 | 12/2016 | Agrawal et al. | |
| 9,936,351 B2* | 4/2018 | Gomes | H04W 4/023 |
| 2005/0058263 A1 | 3/2005 | Frazier | |
| 2009/0046677 A1 | 2/2009 | Toledano et al. | |

(Continued)

FOREIGN PATENT DOCUMENTS

| | | |
|---|---|---|
| CN | 104202461 A | 12/2014 |
| EP | 1940096 A1 | 7/2008 |

OTHER PUBLICATIONS

Google LLC, PCT/US2018/025098, International Search Report / Written Opinion, dated Aug. 22, 2018, 17 pgs.

(Continued)

*Primary Examiner* — Susan I McFadden
(74) *Attorney, Agent, or Firm* — Morgan, Lewis & Bockius LLP

(57) ABSTRACT

A voice-commanded common computing device may be selectively paired other computing devices in a shared network. The common computing device may detect co-presence of paired devices on the shared network, and may determine when audio and/or video content may be cast to devices on the shared network based on the detected co-presence. Audio content may include messages composed by a first user of a first device in the shared network, to be audibly output to a second user of a second device in the shared network. Casting of personal information may include positive authentication and verification prior to audible output of the personal information.

20 Claims, 7 Drawing Sheets

(56) References Cited

U.S. PATENT DOCUMENTS

| | | |
|---|---|---|
| 2009/0150489 A1 | 6/2009 | Davis et al. |
| 2015/0087414 A1 | 3/2015 | Chen et al. |
| 2016/0210105 A1 | 7/2016 | Ru et al. |
| 2016/0352895 A1 | 12/2016 | Son et al. |

OTHER PUBLICATIONS

Invitation to Pay Additional Fees for PCT Application No. PCT/US2018/025098, mailed on Jun. 28, 2018, 16 pages.

* cited by examiner

VOICE CONTROLLED INFORMATION DELIVERY IN PAIRED DEVICES

FIELD

This relates, generally, to voice controlled sharing of information amongst paired devices.

BACKGROUND

Computing devices may be operably coupled, or paired, to exchange information, data and the like. Computing devices may include, for example, mobile computing devices such as smartphones and tablet computers, convertible computing devices, desktop computing devices, laptop computing devices, and other such devices. Computing devices may share information, for example, over a shared network. Information may be output and/or shared between, or among, connected devices, and/or with one or more users, in a variety of different ways.

SUMMARY

In one aspect, a method may include receiving, by a common computing device in a shared network, from a first computing device in a shared network, at a first point in time, message content to be transmitted to a second computing device; detecting, by the common computing device at a second point in time, the second computing device in the shared network; and outputting, by the common computing device, an audible signal corresponding to the message content, in response to the detecting of the second computing device in the shared network.

In another aspect, a method may include detecting, by a common computing device in a shared network, a personal computing device; detecting, by the common computing device, a near field communication (NFC) chip of the personal computing device; authenticating a connection between the common computing device and the personal computing device in response to the detection of the NFC chip of the personal computing device; accessing, by the common computing device, personal information from the personal computing device; and outputting, by the common computing device, audible output corresponding to the personal information from the personal computing device.

The details of one or more implementations are set forth in the accompanying drawings and the description below. Other features will be apparent from the description and drawings, and from the claims.

DETAILED DESCRIPTION

Figure 1:
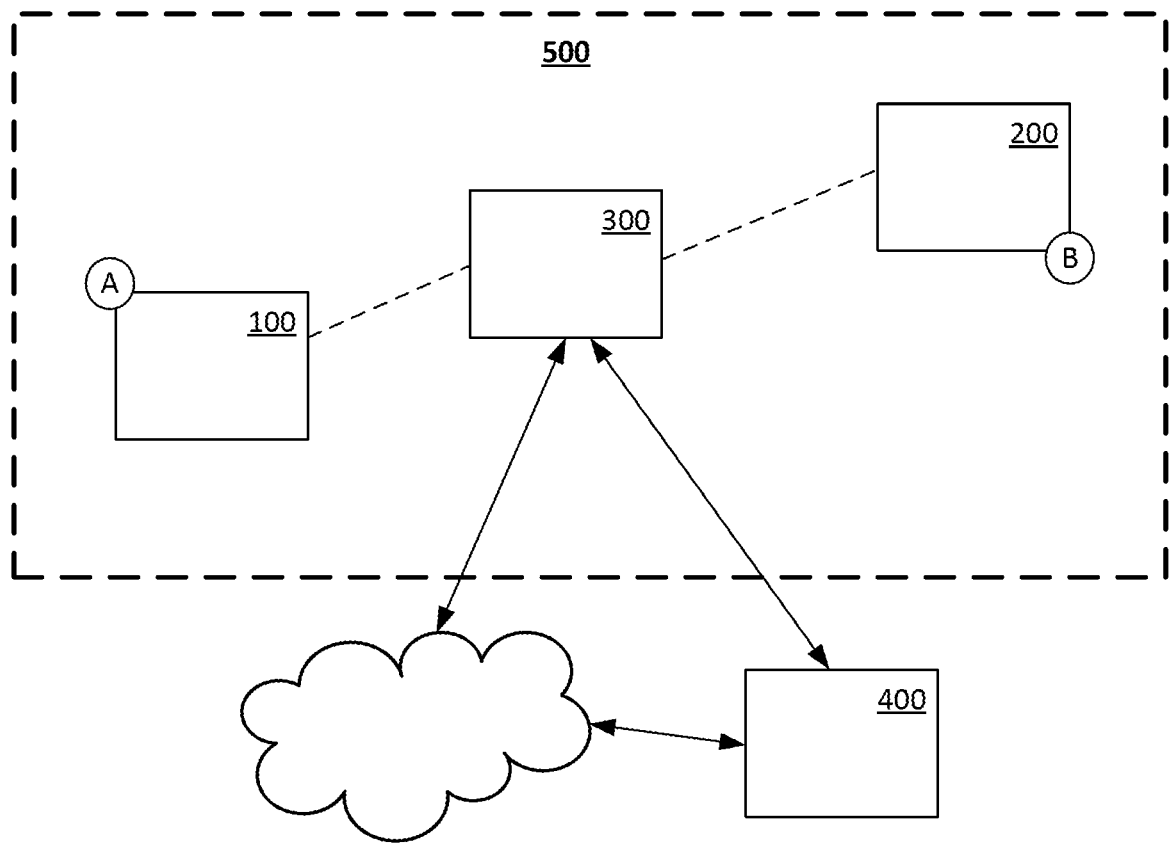
FIG. 1 illustrates an example network of devices, in accordance with implementations described herein.

FIG. 1 illustrates an example implementation of a grouping or network, for example, a shared network 500 of computing devices, which may be operably coupled, or paired, to exchange information. The example shown in FIG. 1 includes a common computing device 300. The common computing device 300 may be, for example, a voice commanded home device that can receive voice commands and execute commands in response to the voice commands, and that can transmit audible output, in conversational, natural language form. The common computing device 300 may be networked within an installation space, for example, a home, to function as an automated assistant. The common computing device 300 may engage with one or more users within the installation space in a variety of different manners to receive commands from the one or more users, and to execute the received commands. For example, the common computing device 300 may engage users in the installation space in a conversational manner, using natural language to receive user commands, and to provide feedback to the user(s), within an audio transmitting and receiving range of the common computing device 300. The common computing device 300 may be connected to a variety of different external devices and/or external sources 400 to obtain information requested by the user(s), to execute command(s) implemented by the user(s), and the like.

In the example shown in FIG. 1, a first computing device 100 and a second computing device 200 may each be selectively paired with the common computing device 300 on a shared network 500, such as, for example, a shared wifi network 500. The first and second devices 100, 200 are exemplary in nature, and such a network may include more computing devices that may be selectively paired with, and may selectively communicate with, the common computing device 300. The first computing device 100 may be, for example, a first mobile device 100 operated by a first user A. The second computing device 200 may be a second mobile device 200 operated by a second user B. In the example to be described with respect to FIG. 1, the first user A and the second user B may be members of a household, simply for ease of discussion and illustration. However, the principles to be described with respect to the network illustrated in FIG. 1 may be applied to other groupings of users, such as, for example, a workplace in which co-workers may engage with the common computing device 300.

In some situations, members of a household may choose to leave each other messages, for example, written messages, in the form of, for example, a written note intended for a particular recipient to receive at a later time. For example, the message may be intended for receipt upon a return home of the recipient, or at another time. Electronic mail, text messaging, and other forms of electronic messaging have not obviated the use of this type of message. That is, in many instances, it may be more relevant for a recipient to receive a message in the appropriate context, and at a particular time, rather than in real time (i.e., at the time the message was composed by the sender). For example, it may be more relevant for the recipient to receive the message "please take the dog for a walk" upon returning home, rather than hours before returning home, while still at work.

In a system and method, in accordance with implementations described herein, this type of message may be delivered to the intended recipient by the common computing device 300. Messages may be delivered by the common computing device 300, for example, in response to detection that the intended recipient of the message has returned home, at a different time selected by the sender, at a different time selected by the recipient, and the like. In some implementations, the message may be delivered to the recipient by the common computing device 300 audibly, in a conversational manner, using natural language. In some implementations, delivery instructions, for composition and delivery of the message, may be received by the common computing device 300 from the sender, in a conversational manner, using natural language.

In the example implementation shown in FIGS. 2A-2E, a voice-commanded common computing device is paired with multiple different computing devices operated by multiple different users through, for example a one-time initialization, or setup, process. After this initialization process, the devices may detect co-presence of other devices in the shared network 500. This detection of co-presence may allow the devices to know when information, for example, audio and/or video output, may be shared with, or cast, to other devices on the shared network. In some implementations, this may allow the voice-commanded computing device to deliver audible messages to intended recipients, and/or recipient devices, in a time-shifted manner, so that messages may be received in an intended context and/or at a relevant time for the particular message.

Figure 2A:
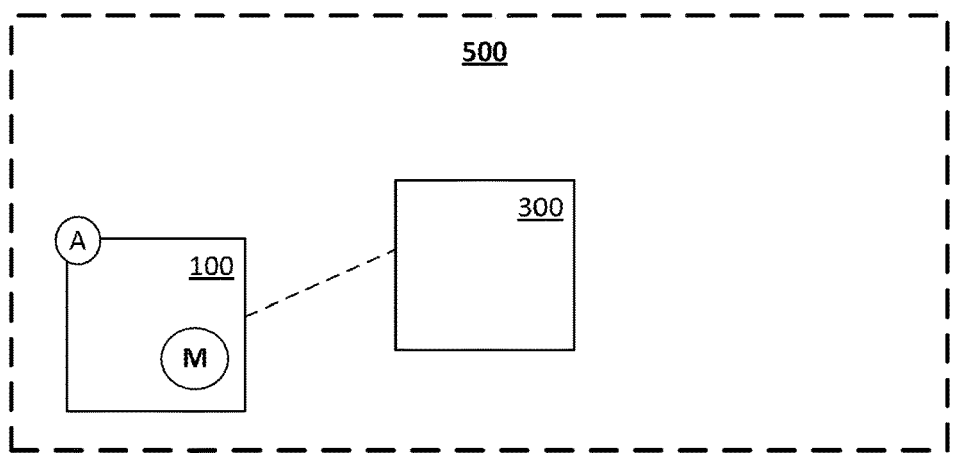
FIGS. 2A-2E illustrate an example of transmission and receipt of messages amongst devices in a shared network, in accordance with implementations described herein.
Figure 2B:
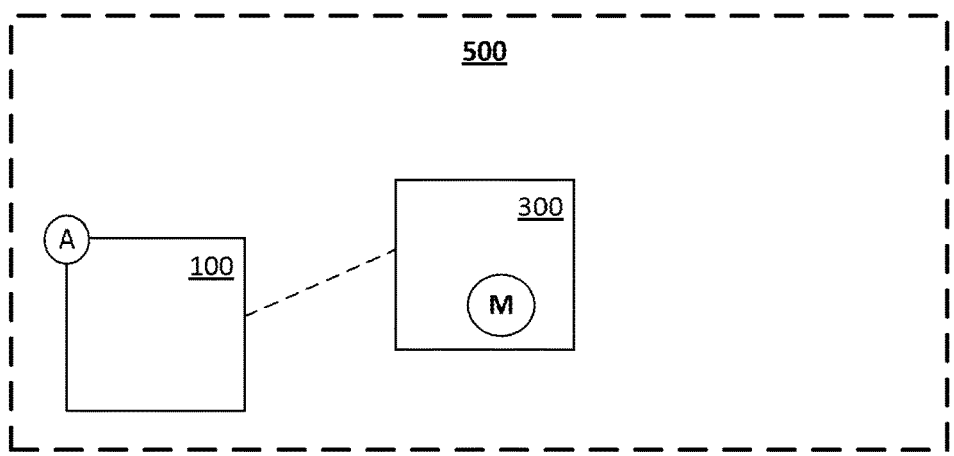

As shown in FIG. 2A, the first computing device 100, operated by the user A, is operably coupled with, or paired with, the common computing device 300 while the first computing device 100 is within the shared network 500. The user A of the first computing device 100 may compose a message M for the user B of the second computing device 200. The user A may compose the message M using, for example, a user interface of the computing device 100. For example, the user A may compose the message M using a keyboard for text entry of the message M. The user A may compose the message M using a microphone to capture audio input corresponding to the message M. The message M composed by the user A as discussed above with respect to FIG. 2A, may be transmitted to the common computing device 300, as shown in FIG. 2B. When transmitting the message M to the common computing device 300, the user A may transmit text associated with the message M to the common computing device 300, and/or may transmit the audio input associated with the message M to the common computing device 300. The user A may select an intended recipient for the message M, and may select a delivery trigger, or a delivery time, for the message to the selected recipient. For example, the user A may indicate that the message M is to be delivered to the user B upon detection of the user B (for example, detection of the second computing device 200 operated by the user B in the shared network 500), or some period of time after detection of the user B, or after verification from the user B of desired delivery of the message M, and the like. Detection of the user B in the shared network 500 may correspond to, for example, detection of the second computing device 200, operated by the user B, in the shared network 500, based on the previous setup/initialization of devices in the shared network 500 as described above.

Figure 2C:
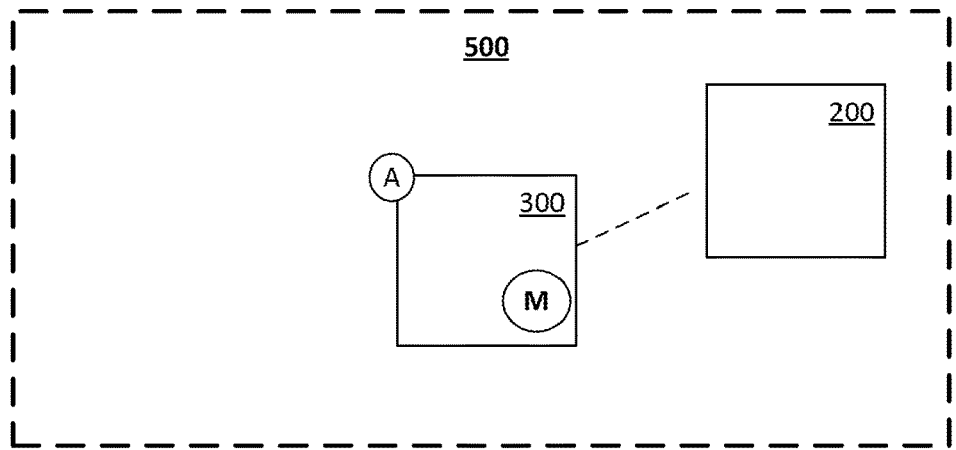
Figure 2D:
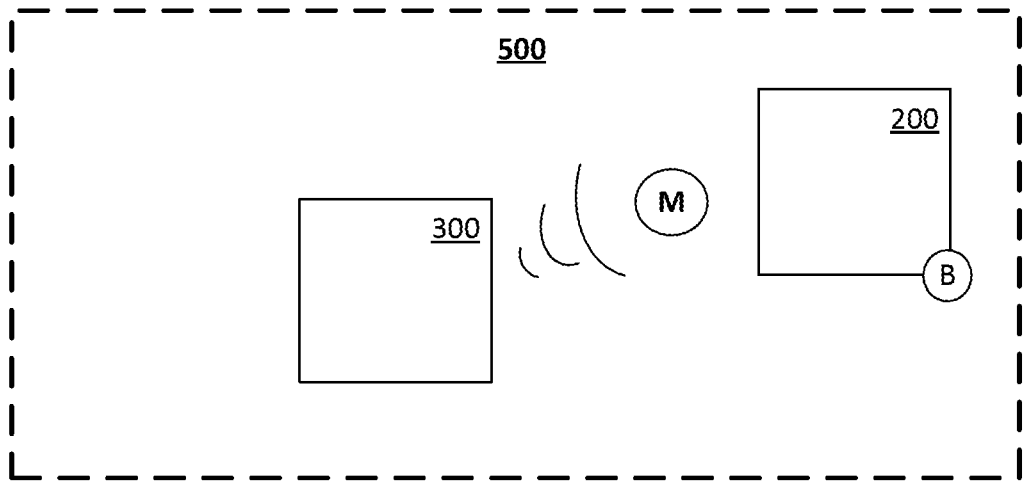
Figure 2E:
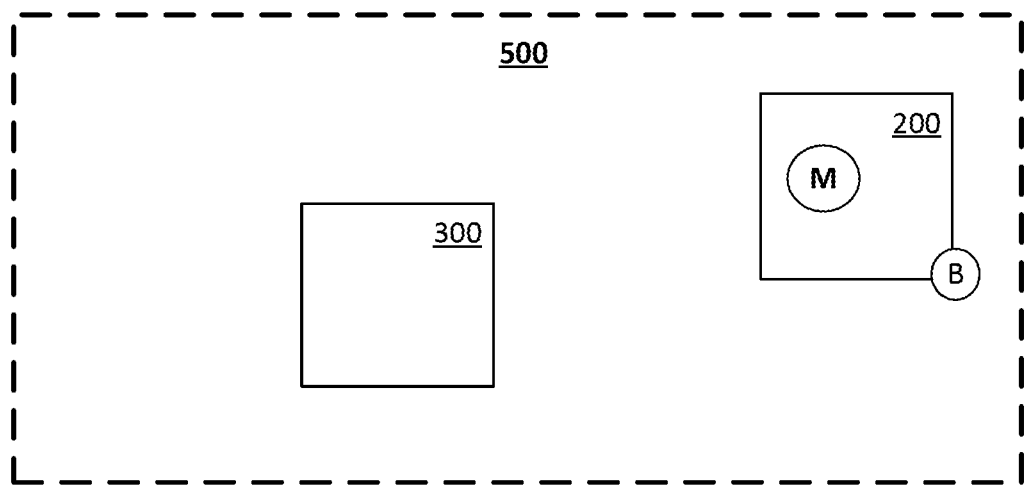

In some implementations, the common computing device 300, having the message M for delivery to the user B, may detect the user B within the shared network 500, as shown in FIG. 2C. In response to detection of the user B within the shared network 500, the common computing device 300 may output the message M to the user B, as shown in FIG. 2D, the user having received the message M as shown in FIG. 2E. In some implementations, the message M may be audibly output to the user B. In a situation in which the user A transmitted the message M to the common computing device 300 in a text format, the common computing device 300 may transcribe the text into speech, and output the message M in an audible, natural language form. In some implementations, the message M output in audible, natural language form to the user B may also be made available to the user B in text form, for storage on the second computing device 200.

In some implementations, delivery of the message M to the user B may be delayed (e.g., time delayed), for example, beyond the detection of the arrival of the recipient (the user B) in the shared network 500. The delay in delivery, beyond the detection of the user B in the shared network 500, may be set by the sender of the message M (the user A), or by the receiver of the message M (the user B). This may allow the recipient (the user B) additional time to, for example, pay more focused attention to the message M/not be otherwise preoccupied with another task, to be within hearing distance or range when the message M is output to the user B, and the like. For example, the user A, when transmitting the message M to the common computing device 300 for delivery to the user A, may also transmit a command to delay delivery to the user B. In some implementations, the delay command from the sender (the user A) may instruct the common computing device 300 to delay delivery of the message M to the recipient (the user B) for a selected period of time after detection of the user B in the shared network 500. This may allow the user B sufficient time to be within audio output range of the common computing device 300 (rather than within the shared network 500 but outside of listening range) and/or to be engaged in listening to the message M without being otherwise occupied by other tasks.

In some implementations, a delay command may be issued by the sender (the user A) to instruct the common computing device 300 to prompt the recipient (the user B) in response to detection of the user B in the shared network 500, prior to transmitting the message M to the user B. For example, in response to detection of the user B in the shared network 500, the common computing device 300 may output an audible indicator to the user B, indicating that the message M is available from the user A.

For example, in response to detection of the user B in the shared network 500, the common computing device 300 may output an indicator, such as, for example an audible indicator in conversational/natural language, to the user B, such as "Jane, you have a message from John. Would you like to hear John's message?" In response to the output of this indicator (for example, audible indicator), the user B may respond to the prompt from the common computing device 300 with a command indicating how the user B would like to proceed with regard to receiving the message from the user A. This may give the recipient (the user B) the opportunity to receive the message, delay receipt of the message, and the like. This may allow the message M to be received by the user B in the intended context (as intended by the user A), but when the user B is able to receive/pay attention to the message M, and/or at a time when others are, or are not, within an audible range of the common computing device 300 (to, for example, maintain a desired level of privacy).

For example, in response to this audible indicator, the user B may respond with a verbal command such as, for example "Yes," or "Yes, play the message now." In response to this type of command from the user B, the common computing device 300 may then output the message M from the user A to the user B. The message B may be audibly output by the common computing device 300, even if the original message M composed by the user A was transmitted to the common computing device 300 in text form. For example, in outputting the message M to the user B, the common computing device 300 may transcribe the message M from text into speech, and audibly output the message M in conversational/natural language to the user B.

In some implementations, in response to this audible indicator from the common computing device 300, the user B may choose to delay receipt of the message M. Thus, the recipient (the user B) may respond to the audible indicator verbal command such as, for example "No," or "Not yet," or "Remind me later," or "Remind me in 15 minutes," and the like. A command such as "Not yet" or "Remind me later" may cause the common computing device 300 to automatically repeat the prompt/audible indicator after some amount of time has elapsed. That interval of time elapsed may be previously set, for example, by the sender (the user A) or by the recipient (the user B), or may be a standard system setting of the common computing device 300.

In some implementations, the recipient (the user B) may respond to the audible indicator with verbal command such as, for example "Send the message to me as a text message," or "Send the message to me as an email," and the like. This may allow the user to save the contents of the message M for future reference, and/or may allow the user to maintain a desired level of privacy.

The recipient (the user B) may transmit a variety of different commands in response to the audible indication from the common computing device 300 that message(s) are available, and the responses noted above are merely examples. The response(s) transmitted by the recipient (the user B) may be verbal commands, output in conversational/natural language. These verbal commands may be interpreted and understood, and implemented/executed by the common computing device 300.

In some implementations, the user A may compose a message M intended only for the user B, and not for other users which may also be included in the shared network 500. The user A may include this type of stipulation in the instructions for delivery when transmitting the message M to the common computing device 300. In this case, when the common computing device 300 detects multiple users present in the shared network 500, the common computing device 500 may delay delivery of the message M to the user B until only the second computing device 200 (operated by the user B) is detected in the shared network 500. This may maintain the level of privacy intended by the user A for delivery of the message M.

Figure 3A:
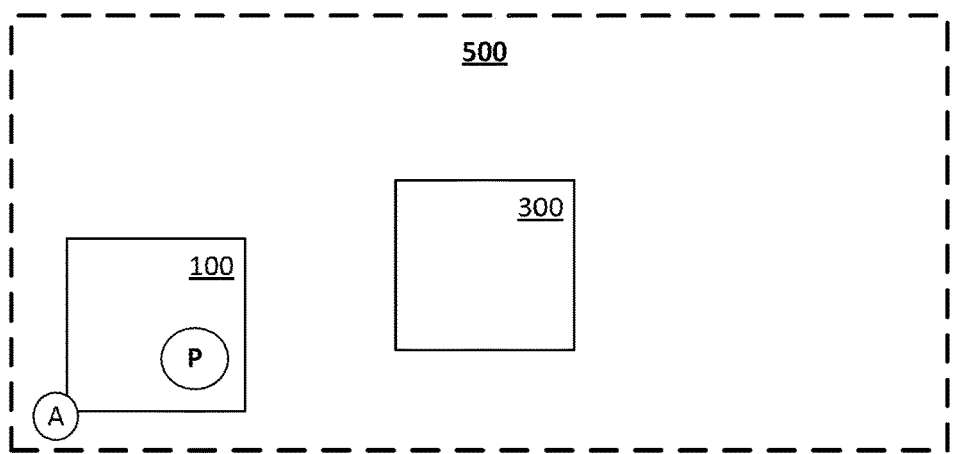
FIGS. 3A-3C illustrate an example of connection of devices in a shared network using near field communication (NFC), in accordance with implementations described herein.
Figure 3B:
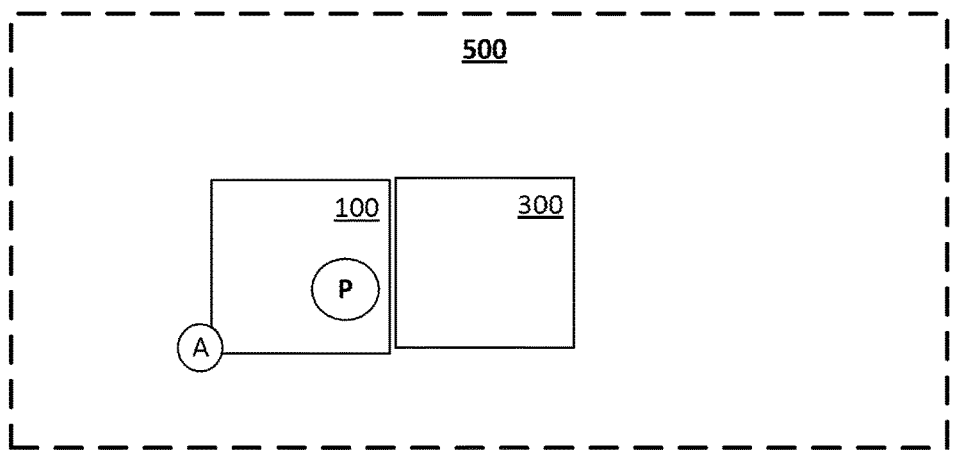
Figure 3C:
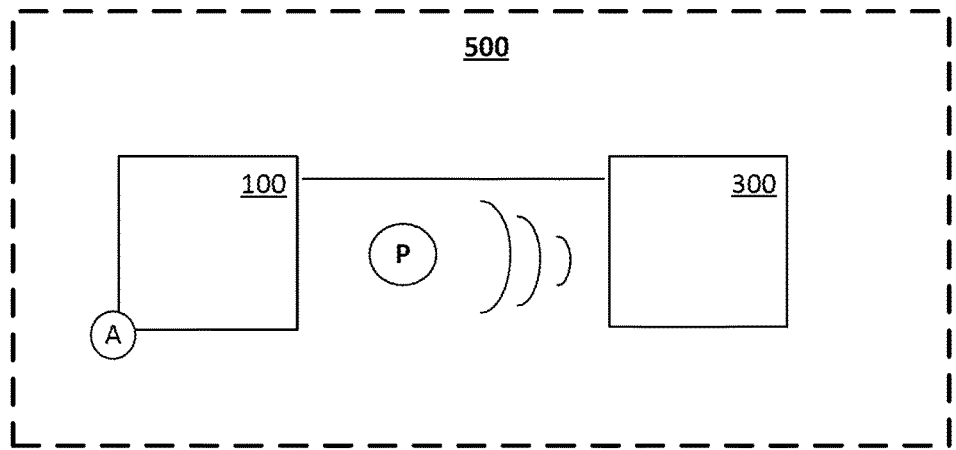

Personal information P may be stored on the various computing devices in the shared network 500, as shown in FIGS. 3A-3C. In some implementations, the common computing device 300 may selectively access personal information P from one or more of the computing devices within the shared network 500, for example, in response to a user command, to convey that personal information to the user of the corresponding computing device. The personal information P may include, for example, calendar information, contact information, new/unread/previously read SMS messages, new/unread/previously read email messages, new/unopened/previously accessed voicemail messages, new/previously accessed social media content, and the like. In some implementations, personal information P may be conveyed to the user, in an audible form, or read aloud to the user, allowing the user to review the personal information P without having to directly access, view on screen, and read the personal information P. In some implementations, the common computing device 300 may gain access to this personal information P, and may obtain authorization to audibly output the personal information P to the user, in response to positive authentication for access to the personal information P.

For example, in some implementations, the common computing device 300 may positively verify identity, and/or may authenticate, the user and the corresponding computing device, prior to accessing personal information P and outputting the personal information P, for example, audibly outputting the personal information P. For example, in some situations, the user A may not want other users in the shared network 500 to have access to the user A's personal information P. Reliable authentication may allow the common computing device 300 to authenticate, access and audibly output personal information P in response to a request from user A.

In some implementations, near field communication (NFC) based authentication may be used, between the common computing device 300 and other computing devices, to access and output, for example, audibly output, personal information P associated with the user of the corresponding computing device. For example, the first computing device 100 and the common computing device 300 may each be equipped with an NFC chip. The user A/first computing device 100 and the common computing device 300 may be in the shared network 500, as shown in FIG. 3A. The first computing device 100 and the common computing device 300 may establish an NFC connection and initiate an authenticated session by, for example, holding the first computing device 100 at, or in close proximity to, the common computing device 300, as shown in FIG. 3B, to authenticate the personal account of the user A with the common computing device 300. In some implementations, NFC access may be further mediated by additional verification of identity such as, for example, a fingerprint scan via the first computing device 100, entry of a security/access code via the first computing device 100, and the like. This may provide further assurance that access to the personal information on the first computing device 100 is only authorized by the user A. In response to successful NFC connection and authentication, personal information P on the first computing device 100 may be accessed by the common computing device 300, and output to the user A, as shown in FIG. 3C.

For example, in response to successful authentication, the common computing device 300 may prompt the user A, regarding personal information P related to the user A, that is accessible from the first computing device 100. The prompt may be, for example, an audible prompt, for example, in conversational/natural language form. The audible prompt output by the common computing device 300 may include, for example, an offer to read personal information P aloud to the user A. For example, the audible prompt may offer to read personal messages (email messages, SMS messages, voicemail messages and the like), calendar events, personal reminders, and other such personal information.

In response to the prompt issued by the common computing device 300, the user A may respond with a command, for example, a verbal command, for execution by the common computing device 300. For example, in response to the prompt regarding the reading of personal information P from the common computing device 300, the user A may instruct the common computing device 300 to (audibly) output the personal information P, or delay the (audible) output of the personal information P, or may indicate the user A does not want the common computing device 300 to access/output the personal information P, and the like.

For example, after authentication, the common computing device 300 may output an audible prompt such as "John, you have three new email messages. Would you like to hear them?" The user A may respond to this audible prompt with a command, for example, a verbal command, for execution by the common computing device 300. For example, the user A may respond to this audible prompt with a verbal command of "No." In some implementations, the common computing device 300 may respond to the verbal command "No" by simply acknowledging the command, for example, with an audible output of "Okay" or "Okay, I won't read your new email messages" to the user A. In some implementations, the common computing device 300 may respond to the verbal command "No" by acknowledging the command, and offering to extend the current authentication period. This may include, for example, an audible output of "Okay, I won't read your messages. If you'd like to leave your messages and calendar unlocked so I can read them to you later, you can say 'unlock my account for 15 minutes.'" This may allow the user A to decide, based on for example, the amount of personal information P, the type of personal information P and the like, how much, and when, to listen to the available personal information P.

In the example(s) described above, the user A may initiate the audible output of personal information P y the common computing device 300 by placing the first computing device 100 adjacent to the common computing device 300 as shown in FIG. 3B to establish an NFC connection and initiate an authenticated session. In some situations, the user A may issue a verbal command to the common computing device 300 which requires access to personal information, but has not initiated an authenticated session as described above. In this case, the common computing device 300 may prompt the user A to hold the device 100 up to the common computing device 300 to establish an NFC connection and initiate the authenticated session.

In the example exchanges between the user A and the common computing device 300 described above, information is audibly output by the common computing device 300, in a conversational/natural language manner. Commands issued by the user A, for example, to initiate interaction with the common computing device 300 and/or in response to audible prompts output by the common computing device 300, may be verbal commands. The common computing device 300 may parse the detected verbal commands from the user A, and may output an intelligent, conversational/natural language response to the user A, and/or execute the command(s) accordingly. In some implementations, this type of NFC authentication, between a personal device and the common computing device 300 may work only with personal devices that have already been set up, or initialized, or paired with, the common computing device 300 during the initial setup process as described above. In some implementations, the system may be set to grant temporary read access to other devices without prior setup.

Connection and communication between devices may allow information, for example, content, to be shared between connected devices. For example, media systems may allow content to be cast from a first device (for example, a personal mobile device) to a second device (for example, a larger audio video system) to output video (and audio) content. In some situations, setup for casting between a mobile device and a larger media device may be somewhat complex, requiring numerous steps executed in multiple different locations within applications on the devices. For example, setup for casting between a mobile device and a media device may include establishing a connection between the two devices, locating content in one of numerous mobile applications, executing a casting application on both devices, and the like. Once casting has been successfully implemented to the media device, a third device may then be involved in controlling and interacting with the cast content.

In some implementations, the common computing device 300 may output an indicator, indicating information is available for output to a particular user of a detected/paired computing device. For example, the common computing device 300 may, in response to detection of/pairing with the first computing device 100, output an indicator, indicating to the user of the first computing device 100 that information is available for output to the first user. The indicator may be, for example, an audible indicator, output by the common computing device 300 in natural language form to the user of the first computing device 100, indicating to the user that information is available for output to the user. The information available for output to the user may include, for example, a message left by another user, for delivery to the user of the first computing device 100 when detected in the network 500, as described above. The information available for output to the user may include, for example, personal information available on the first computing device 100 (for example, unread messages such as text messages, email messages and the like), as described above.

In some implementations, the audible indicator may be output by the common computing device 300 based on a relatively low confidence threshold of the presence of the user in the vicinity of the common computing device 300, for example, based simply on detection of the user's device in the network 500. For example, upon detection of the first computing device 100 in the network 500, the common computing device 300 may output an audible indicator announcing "New messages for Robert." The common computing device 300 may follow this audible indicator with a prompt, requesting that the user confirm, or authenticate, physical presence in a higher confidence manner. This may include, for example, an audible prompt output by the common computing device 300 requesting that the user confirm presence, for example, audibly, to allow output of information. In some implementations, a higher confidence confirmation may be requested. This may include a prompt, for example, an audible prompt, requesting that the user conduct NFC authentication between the first computing device 100 and the common computing device 300 as described above, that the user conduct a fingerprint scan on a control surface of the first computing device 100, that the user provide a passcode, and the like, to allow the information to be audibly output by the common computing device 300.

In some implementations, pairing between a first electronic device and a second electronic device may be established using NFC, for example, in the manner described above, allowing the devices to readily communicate and share information. NFC authentication and subsequent connection between, for example, a mobile device (for example, the first computing device 100) and a media device 600 (for example, a television or projector), as shown in FIGS.

4A-4C, may provide for relatively simple, intuitive casting of content, and control of the cast content.

Figure 4A:
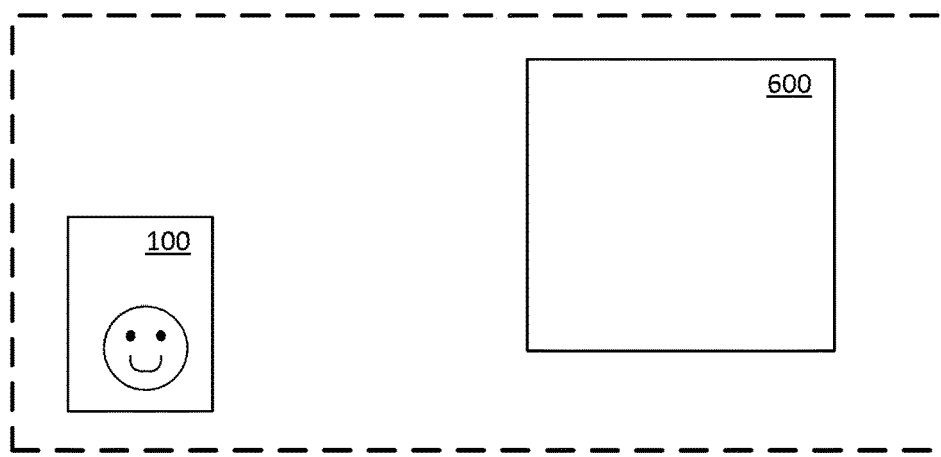
FIGS. 4A-4C illustrate an example of casting of content between devices connected using NFC, in accordance with implementations described herein.
Figure 4B:
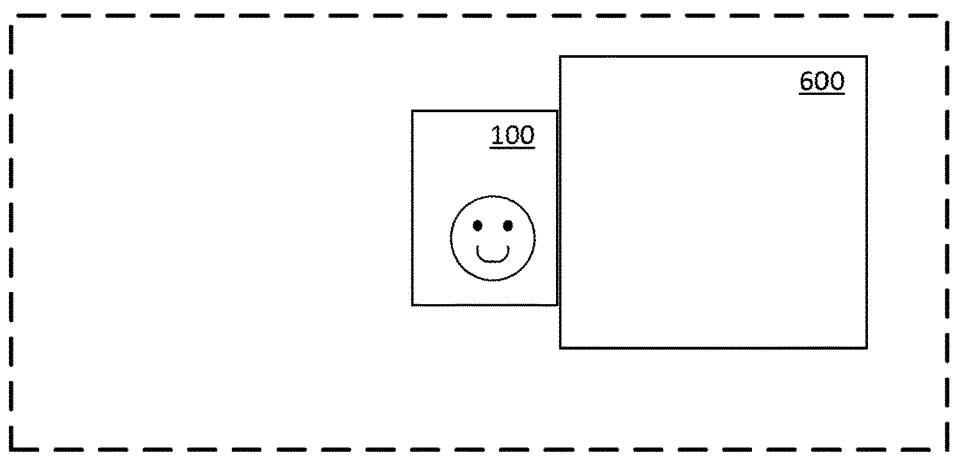
Figure 4C:
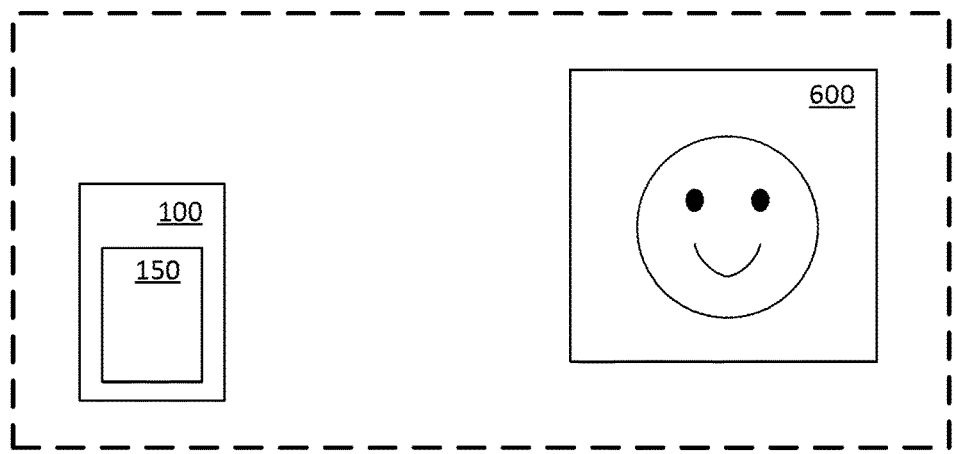

As shown in FIGS. 4A and 4B, the mobile device 100 and the media device 600 may each be equipped with an NFC chip. The system may pair the mobile device 100 and the media device 600 through, physical contact via their respective NFC chips. For example, the user may hold the mobile device 100 at, or in close proximity to, the front panel of the media device 600, to establish a connection between the mobile device 100 and the media device 600, as shown in FIG. 4B. This may provide for automated casting of content from the mobile device 100 to the media device 600, as shown in FIG. 4C, simply by providing for the physical contact between the mobile device 100 and the media device 600.

Figure 5:
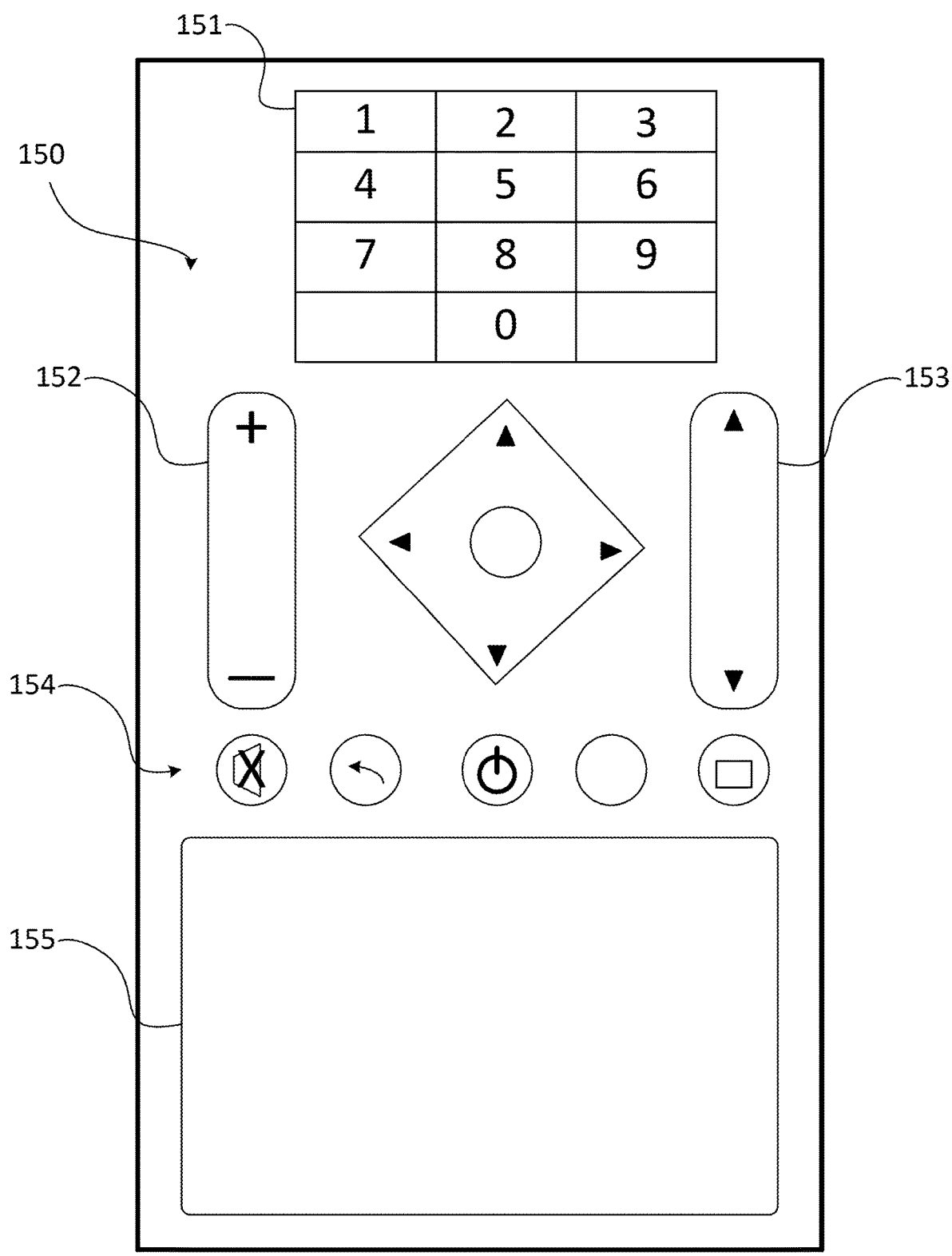
FIG. 5 illustrates an example user interface of a device shown in FIGS. 4A-4C, in accordance with implementations described herein.

This may also enable operation in a remote control mode. For example, in response to the detected NFC connection, the operating system of the mobile device 100 may launch an application that provides for simple remote control of the content cast to/displayed on the media device 600, as shown in FIG. 4C. In some implementations, this remote control application may display a user interface 150, as shown in FIG. 5. The user interface 150 may include, for example, a number pad 151, swipe controls 152, 153 for adjusting volume and channels and the like, and buttons 154 for controlling power, mute, return functions, input functions, and the like. The user interface 150 may also include a trackpad area 155. The trackpad area 155 may allow the user to move a cursor displayed with the cast content, make a selection corresponding to the position of the cursor by touching the trackpad area 155 (for example, simulating a click), and the like. Manipulation of a button on the user interface may un-pair the mobile device 100 from the media device 600, and terminate the casting of content.

In some situations, the media device 600 may be in an off state when the mobile device 100 is brought into physical contact with the media device 600 as shown in FIG. 4B. Thus, in some implementations, the media device 600 may be powered on, and brought into an on-state, in response to the NFC pairing with the mobile device 100. The system may then proceed with the automated casting and/or the launching of the remote control application as described above. In some implementations, initial pairing of the mobile device 100 and the media device may be accomplished through NFC as described above, with further communication between the mobile device 100 and the media device 600 supported by, for example, a wifi connection provided in a shared network and the like.

In some implementations, the pairing may happen transitively with one device mediating the pairing of two other devices. For example, if the common computing device 300 had been previously paired with and is capable of communicating with the media device 600, then another device, such as, for example, the first computing device 100, may make a connection with the common computing device 300 using a protocol that the common computing device 300 and the media device 600 may support (such as, for example, NFC). In this arrangement, the common computing device 300 may mediate the pairing of the first computing device 100 to the media device 600. For example the first computing device 100 (or the second computing device 200, or another computing device having NFC capability) may be swiped near a device, such as, for example, the common computing device 300, that has an NFC panel. This may allow the common computing device 300 to pass on pairing information via a different protocol such as, for example wifi, to the media device 600, such that the first computing device 100 and the media device 600 may be paired.

Figure 6:
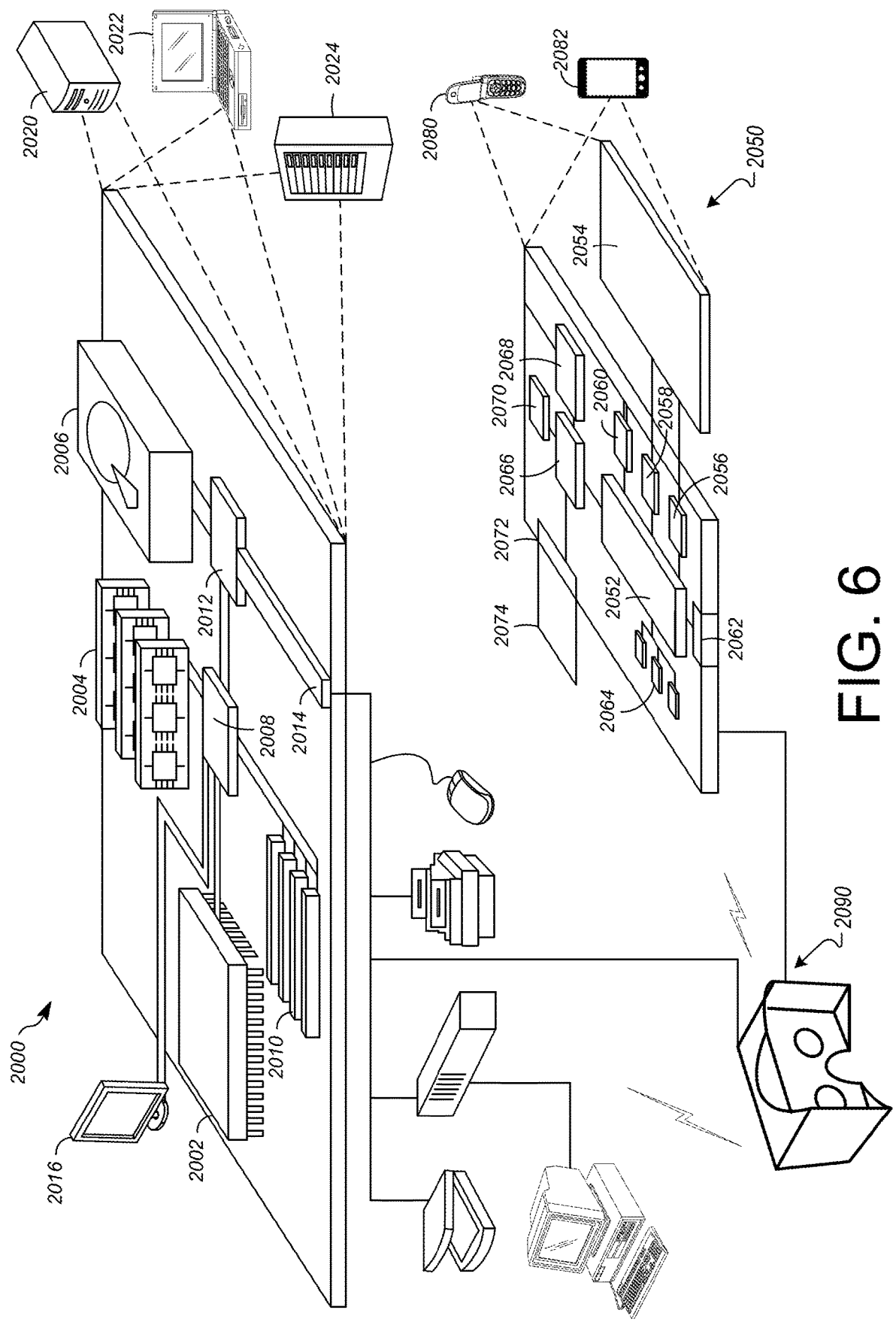
FIG. 6 illustrates example computing device(s) and mobile computing device(s) that can be used to implement the techniques described herein.

FIG. 6 shows an example of a computer device 2000 and a mobile computer device 2050, which may be used with the techniques described here. Computing device 2000 includes a processor 2002, memory 2004, a storage device 2006, a high-speed interface 2008 connecting to memory 2004 and high-speed expansion ports 2010, and a low speed interface 2012 connecting to low speed bus 2014 and storage device 2006. Each of the components 2002, 2004, 2006, 2008, 2010, and 2012, are interconnected using various busses, and may be mounted on a common motherboard or in other manners as appropriate. The processor 2002 can process instructions for execution within the computing device 2000, including instructions stored in the memory 2004 or on the storage device 2006 to display graphical information for a GUI on an external input/output device, such as display 2016 coupled to high speed interface 2008. In other implementations, multiple processors and/or multiple buses may be used, as appropriate, along with multiple memories and types of memory. Also, multiple computing devices 2000 may be connected, with each device providing portions of the necessary operations (e.g., as a server bank, a group of blade servers, or a multi-processor system).

The memory 2004 stores information within the computing device 2000. In one implementation, the memory 2004 is a volatile memory unit or units. In another implementation, the memory 2004 is a non-volatile memory unit or units. The memory 2004 may also be another form of computer-readable medium, such as a magnetic or optical disk.

The storage device 2006 is capable of providing mass storage for the computing device 2000. In one implementation, the storage device 2006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 2004, the storage device 2006, or memory on processor 2002.

The high speed controller 2008 manages bandwidth-intensive operations for the computing device 2000, while the low speed controller 2012 manages lower bandwidth-intensive operations. Such allocation of functions is exemplary only. In one implementation, the high-speed controller 2008 is coupled to memory 2004, display 2016 (e.g., through a graphics processor or accelerator), and to high-speed expansion ports 2010, which may accept various expansion cards (not shown). In the implementation, low-speed controller 2012 is coupled to storage device 2006 and low-speed expansion port 2014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2000 may be implemented in a number of different forms, as shown in the figure. For example, it may be implemented as a standard server 2020, or multiple times in a group of such servers. It may also be implemented as part of a rack server system 2024. In addition, it may be implemented in a personal computer such as a laptop computer 2022. Alternatively, components from computing device 2000 may be combined with other components in a mobile device (not shown), such as device 2050. Each of such devices may contain one or more of computing device 2000, 2050, and an entire system may be made up of multiple computing devices 2000, 2050 communicating with each other.

Computing device 2050 includes a processor 2052, memory 2064, an input/output device such as a display 2054, a communication interface 2066, and a transceiver 2068, among other components. The device 2050 may also be provided with a storage device, such as a microdrive or other device, to provide additional storage. Each of the components 2050, 2052, 2064, 2054, 2066, and 2068, are interconnected using various buses, and several of the components may be mounted on a common motherboard or in other manners as appropriate.

The processor 2052 can execute instructions within the computing device 2050, including instructions stored in the memory 2064. The processor may be implemented as a chipset of chips that include separate and multiple analog and digital processors. The processor may provide, for example, for coordination of the other components of the device 2050, such as control of user interfaces, applications run by device 2050, and wireless communication by device 2050.

Processor 2052 may communicate with a user through control interface 2058 and display interface 2056 coupled to a display 2054. The display 2054 may be, for example, a TFT LCD (Thin-Film-Transistor Liquid Crystal Display) or an OLED (Organic Light Emitting Diode) display, or other appropriate display technology. The display interface 2056 may comprise appropriate circuitry for driving the display 2054 to present graphical and other information to a user. The control interface 2058 may receive commands from a user and convert them for submission to the processor 2052. In addition, an external interface 2062 may be provided in communication with processor 2052, so as to enable near area communication of device 2050 with other devices. External interface 2062 may provide, for example, for wired communication in some implementations, or for wireless communication in other implementations, and multiple interfaces may also be used.

The memory 2064 stores information within the computing device 2050. The memory 2064 can be implemented as one or more of a computer-readable medium or media, a volatile memory unit or units, or a non-volatile memory unit or units. Expansion memory 2074 may also be provided and connected to device 2050 through expansion interface 2072, which may include, for example, a SIMM (Single In Line Memory Module) card interface. Such expansion memory 2074 may provide extra storage space for device 2050, or may also store applications or other information for device 2050. Specifically, expansion memory 2074 may include instructions to carry out or supplement the processes described above, and may include secure information also. Thus, for example, expansion memory 2074 may be provided as a security module for device 2050, and may be programmed with instructions that permit secure use of device 2050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 2064, expansion memory 2074, or memory on processor 2052, that may be received, for example, over transceiver 2068 or external interface 2062.

Device 2050 may communicate wirelessly through communication interface 2066, which may include digital signal processing circuitry where necessary. Communication interface 2066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 2068. In addition, short-range communication may occur, such as using a Bluetooth, Wi-Fi, or other such transceiver (not shown). In addition, GPS (Global Positioning System) receiver module 2070 may provide additional navigation- and location-related wireless data to device 2050, which may be used as appropriate by applications running on device 2050.

Device 2050 may also communicate audibly using audio codec 2060, which may receive spoken information from a user and convert it to usable digital information. Audio codec 2060 may likewise generate audible sound for a user, such as through a speaker, e.g., in a handset of device 2050. Such sound may include sound from voice telephone calls, may include recorded sound (e.g., voice messages, music files, etc.) and may also include sound generated by applications operating on device 2050.

The computing device 2050 may be implemented in a number of different forms, as shown in the figure. For example, it may be implemented as a cellular telephone 2080. It may also be implemented as part of a smart phone 2082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube)

or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 20 can include sensors that interface with a virtual reality (VR headset/HMD device 2090). For example, one or more sensors included on a computing device 2050 or other computing device depicted in FIG. 20, can provide input to VR headset 2090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 2050 can use the sensors to determine an absolute position and/or a detected rotation of the computing device in the VR space that can then be used as input to the VR space. For example, the computing device 2050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 2050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 2050 when the computing device is incorporated into the VR space can cause a particular action to occur in the VR space.

In some implementations, a touchscreen of the computing device 2050 can be rendered as a touchpad in VR space. A user can interact with the touchscreen of the computing device 2050. The interactions are rendered, in VR headset 2090 for example, as movements on the rendered touchpad in the VR space. The rendered movements can control virtual objects in the VR space.

In some implementations, one or more output devices included on the computing device 2050 can provide output and/or feedback to a user of the VR headset 2090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 2050 may appear as another object in a computer-generated, 3D environment. Interactions by the user with the computing device 2050 (e.g., rotating, shaking, touching a touchscreen, swiping a finger across a touch screen) can be interpreted as interactions with the object in the VR space. In the example of the laser pointer in a VR space, the computing device 2050 appears as a virtual laser pointer in the computer-generated, 3D environment. As the user manipulates the computing device 2050, the user in the VR space sees movement of the laser pointer. The user receives feedback from interactions with the computing device 2050 in the VR environment on the computing device 2050 or on the VR headset 2090.

In some implementations, a computing device 2050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 2000 is intended to represent various forms of digital computers and devices, including, but not limited to laptops, desktops, workstations, personal digital assistants, servers, blade servers, mainframes, and other appropriate computers. Computing device 2050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method performed at a common computing device communicatively connected to a shared network, comprising:
   receiving by the common computing device, from a first user of a first computing device via the shared network, at a first point in time, message content to be transmitted to a second user of a second computing device;
   detecting by the common computing device at a second point in time a presence of the second user within the shared network by detecting a presence of the second computing device in the shared network; and
   in response to the detecting:
     generating by the common computing device an audio signal corresponding to the message content; and
     outputting by the common computing device the audio signal to the second user.

2. The method of claim 1, wherein receiving the message content includes receiving the message content in text form.

3. The method of claim 2, wherein generating the audio signal corresponding to the message content includes:
   transcribing the text form of the message content from text into speech; and
   audibly outputting the transcribed message content.

4. The method of claim 1, wherein outputting by the common computing device the audio signal to the second user includes:
   outputting the audio signal after a delay interval has elapsed from the detecting the presence of the second computing device in the shared network.

5. The method of claim 1, wherein generating the audio signal corresponding to the message content includes:
   outputting an audible prompt to the second user, the audible prompt including notification that a message is available for delivery;
   receiving, in response to the audible prompt, an audible delivery consent from the second user; and
   outputting the message content in audible form in response to the audible delivery consent.

6. The method of claim 1, wherein generating by the common computing device the audio signal corresponding to the message content includes:
   outputting a first audible prompt to the second user, the first audible prompt including notification that a message is available for delivery;
   outputting a second audible prompt to the second user, the second audible prompt requesting authentication of the second user;
   receiving the requested authentication of the second user; and
   outputting the message content in audible form to the second user in response to the receiving of the authentication.

7. The method of claim 6, wherein receiving the requested authentication includes at least one of:
   receiving authentication in response to detection of a near field communication (NFC) chip of the second computing device by the common computing device;
   receiving authentication in response to detection of a previously set passcode entered at one of the second computing device, the common computing device, or detected audibly by the common computing device; or
   receiving authentication in response to identification of a fingerprint entry at one of the second computing device or the common computing device.

8. The method of claim 1, further comprising:
   receiving, by the common computing device, pairing configuration information from the first computing device;
   arranging, by the common computing device, pairing between the first computing device and an auxiliary computing device in the network based on the pairing configuration information; and
   exchanging information between the first computing device and the auxiliary computing device paired by the common computing device.

9. The method of claim 8, wherein the exchanging of information between the first computing device and the auxiliary computing device includes casting audio and video information from the first computing device to the auxiliary computing device, for output of the audio and video information by the auxiliary computing device.

10. An electronic device communicatively connected to a shared network, comprising:
    one or more processors;
    memory; and
    one or more programs stored in the memory and executable by the one or more processors, the one or more programs comprising instructions for:
      receiving, by the electronic device from a first user of a first computing device via the shared network, at a first point in time, message content to be transmitted to a second user of a second computing device;

detecting by the electronic device at a second point in time a presence of the second user within the shared network by detecting a presence of the second computing device in the shared network; and in response to the detecting:
generating by the electronic device an audio signal corresponding to the message content; and
outputting by the electronic device the audio signal to the second user.

11. The electronic device of claim 10, wherein the instructions for receiving the message content include instructions for receiving the message content in text form.

12. The electronic device of claim 11, wherein the instructions for generating the audio signal corresponding to the message content include instructions for:
transcribing the text form of the message content from text into speech; and
audibly outputting the transcribed message content.

13. The electronic device of claim 10, wherein the instructions for outputting by the electronic device the audio signal to the second user include instructions for:
outputting the audio signal after a delay interval has elapsed from the detecting the presence of the second computing device in the shared network.

14. The electronic device of claim 10, wherein the instructions for generating the audio signal corresponding to the message content include instructions for:
outputting an audible prompt to the second user, the audible prompt including notification that a message is available for delivery;
receiving, in response to the audible prompt, an audible delivery consent from the second user; and
outputting the message content in audible form in response to the audible delivery consent.

15. The electronic device of claim 10, wherein the instructions for generating by the electronic device the audio signal corresponding to the message content include instructions for:
outputting a first audible prompt to the second user, the first audible prompt including notification that a message is available for delivery;
outputting a second audible prompt to the second user, the second audible prompt requesting authentication of the second user;
receiving the requested authentication of the second user; and
outputting the message content in audible form to the second user in response to the receiving of the authentication.

16. A non-transitory computer-readable storage medium storing one or more programs, the one or more programs comprising instructions, which when executed by an electronic device, cause the electronic device to perform operations including:

receiving, by the electronic device from a first user of a first computing device via the shared network, at a first point in time, message content to be transmitted to a second user of a second computing device;

detecting by the electronic device at a second point in time a presence of the second user within the shared network by detecting a presence of the second computing device in the shared network; and in response to the detecting:
generating by the electronic device an audio signal corresponding to the message content; and
outputting by the electronic device the audio signal to the second user.

17. The non-transitory computer-readable storage medium of claim 16, wherein receiving the message content includes receiving the message content in text form.

18. The non-transitory computer-readable storage medium of claim 16, wherein generating the audio signal corresponding to the message content includes:
outputting the message content in audible form after a delay interval has elapsed from the detection of the second computing device in the shared network.

19. The non-transitory computer-readable storage medium of claim 16, the one or more programs comprising instructions, which when executed by the electronic device, cause the electronic device to perform operations comprising:
receiving pairing configuration information from the first computing device;
arranging pairing between the first computing device and an auxiliary computing device in the network based on the pairing configuration information; and
exchanging information between the first computing device and the auxiliary computing device paired by the electronic device.

20. The non-transitory computer-readable storage medium of claim 19, wherein the exchanging of information between the first computing device and the auxiliary computing device includes casting audio and video information from the first computing device to the auxiliary computing device, for output of the audio and video information by the auxiliary computing device.

* * * * *